Jan. 24, 1933. B. RONAY 1,895,232
PATTERN FOR RAIL WELDING MOLDS
Filed Aug. 5, 1932 3 Sheets-Sheet 1

INVENTOR
Bela Ronay
BY
HIS ATTORNEY

Jan. 24, 1933.  B. RONAY  1,895,232
PATTERN FOR RAIL WELDING MOLDS
Filed Aug. 5, 1932   3 Sheets-Sheet 2
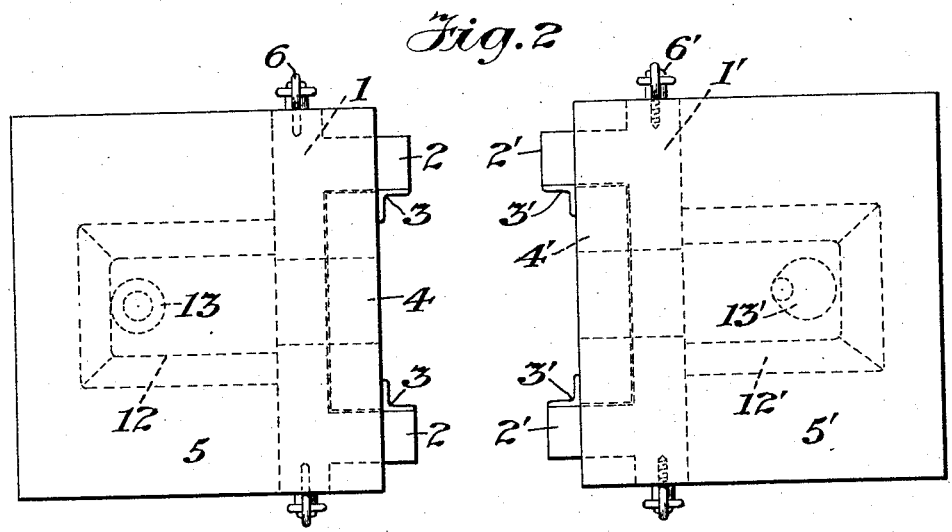
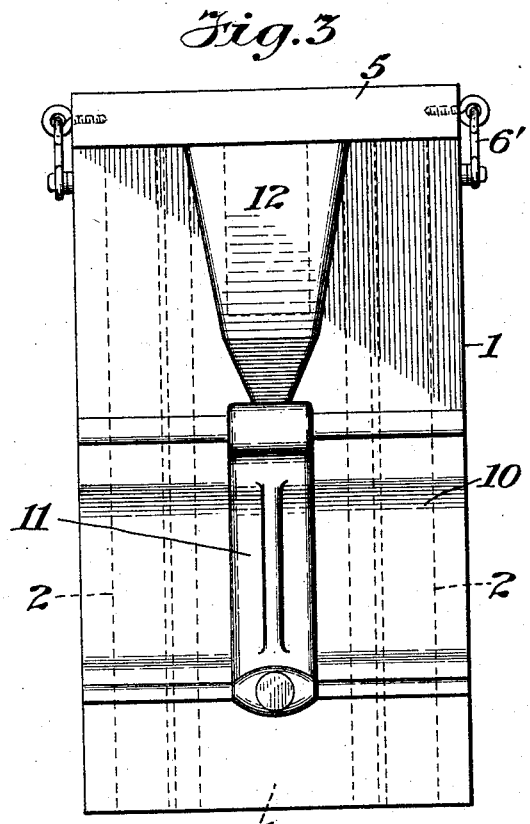
INVENTOR
Bela Ronay
BY
HIS ATTORNEY Patented Jan. 24, 1933

1,895,232

UNITED STATES PATENT OFFICE

BELA RONAY, OF ANNAPOLIS, MARYLAND, ASSIGNOR TO METAL & THERMIT CORPORATION, OF CARTERET, NEW JERSEY, A CORPORATION OF NEW JERSEY

PATTERN FOR RAIL WELDING MOLDS

Application filed August 5, 1932. Serial No. 627,583.

The invention relates to patterns for rail welding molds and has for its object to provide said patterns in such form as to be adaptable in the construction or formation of standard two part molds or of special four part molds, thereby avoiding the necessity of providing separate sets of patterns for these different mold types as has been the practice heretofore.

The invention is illustrated in the accompanying drawings, in which:—

Fig. 2 is a plan view of the pattern sets.

Fig. 3 is a front elevation of the pattern for the mold section or sections for the groove or lip side of the rail.

Figure 1:
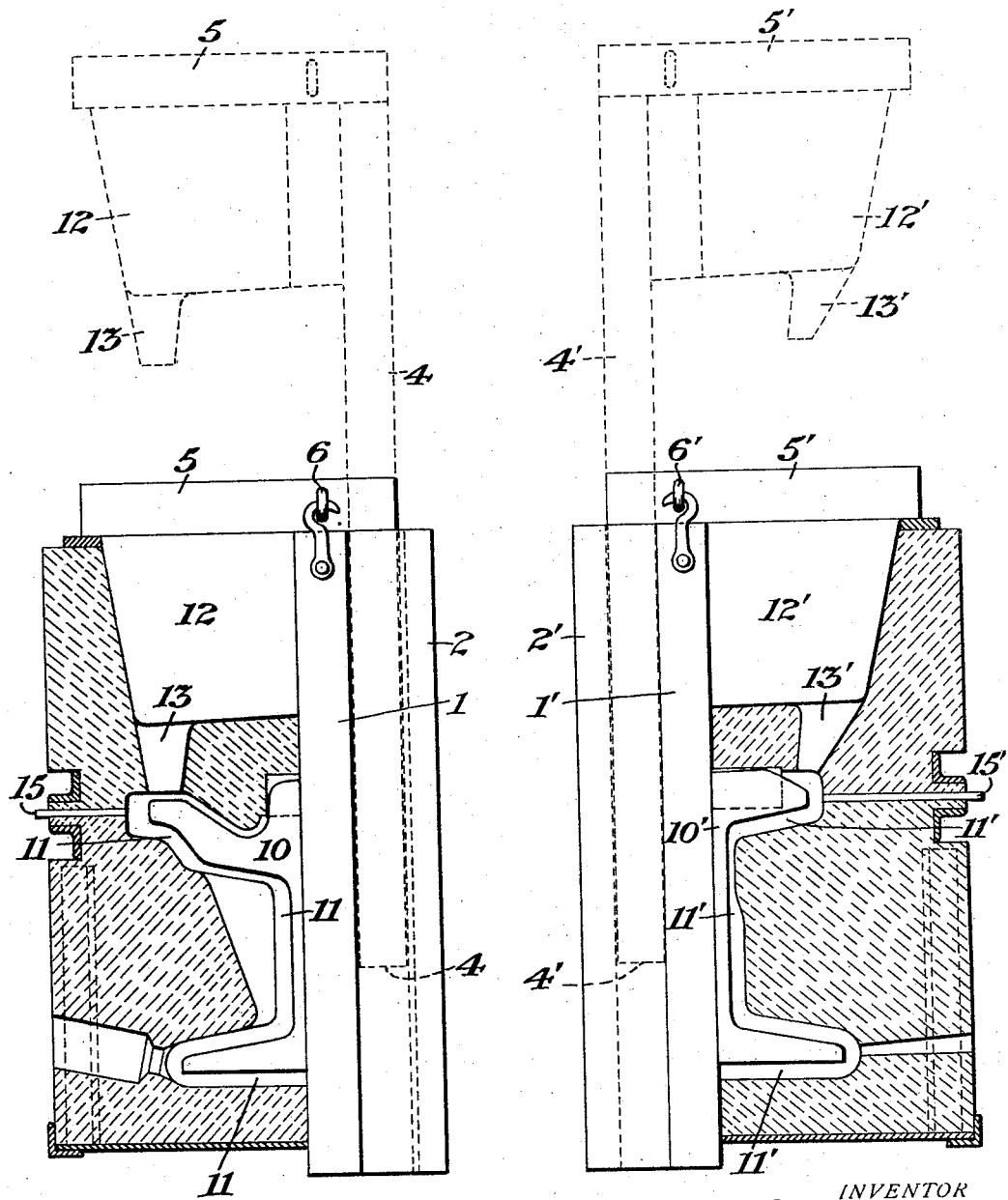
Fig. 1 is an end elevation of a set of patterns applied in the construction of a four part mold for welding girder or trilby rails, the mold parts being shown in section.

In the art of welding rails by fusing the ends thereof together by means of superheated molten metal, such as thermit steel or steel alloys, the general practice has been to surround and enclose the ends of the rails in a refractory mold, usually formed of two parts, so that the completed mold is divided on a vertical plane coincident with the longitudinal axes of the rails. When these two part molds are employed for welding T-rails, there is no particular complication because the rails are symmetrical about a vertical axis and the half molds are parted on the vertical plane aforesaid, but, in the case of girder or trilby rails, no such symmetry exists and consequently that portion of the mold which is designed to fit into the groove of the rail between the head and lip portion cannot be part of the corresponding half mold, but must be formed either as a separate core piece or by packing refractory mold material into the groove before the application of the two half molds.

In rail welding work under traffic, it has been customary to employ three part molds, such as disclosed in the patent to Deppeler No. 1,813,032, comprising lower mold sections enclosing the rail ends to substantially the level of the tread surface of the rails, and an upper or cope section fitted to and constituting a completing supplement to the lower sections, so that the upper or cope section may be removed during the welding operations to allow the passage of traffic over the site of the joint. With this three part mold, the cope portion necessarily includes the portion of the refractory material which extends into the grooves of the rails and thus eliminates the necessity of forming a separate core for the groove section as hereinbefore stated.

In the commercial practice of aluminothermic welding of rails, some operators prefer the standard practice and avoid any interference with traffic by discontinuing operations while traffic is passing. On the other hand, others find it necessary or prefer to do all of their welding with three part molds and without interrupting traffic; while others, who do the bulk of their work with two part molds, thereby interrupting traffic, occasionally, desire to do some work without interruption to traffic and are, therefore, obliged to keep on hand two sets of welding equipment for the same rail contours, including two sets of patterns, one set for the two part mold and another and separate set for the three part mold. To avoid the difficulty and expense of providing duplicate pattern and mold box equipment, it has been found that, by employing pattern sets of the character hereinafter described and by dividing each half mold box horizontally at about the level of the running surface of the rails, the necessary equipment for performing the welding operations, under either of the conditions aforesaid relative to traffic, will require only one set of mold boxes and one set of patterns for forming either two part or four part mold sections, and the present invention has to do with the special construction of the patterns to adapt the same to the construction of either two part or four part molds.

Referring to the drawings, which illustrate the invention as applied to pattern sets for forming molds employed in the welding of girder or trilby rails, 1 indicates the backboard as employed for the formation of the mold section for the groove or lip side of the rails, the rear face of the backboard being provided with spaced guide members 2, 2, fitted with angle irons 3, 3, between which guides is located a slide 4 capable of movement in a plane parallel to the surface of the backboard, the slide being held in position by the angle irons 3, 3. Secured to the upper end of the slide 4 is a headboard 5, which, in its various positions of operation, is normal to the plane of the backboard 1. A similar construction and arrangement of backboard, headboard and slide is provided for the co-ordinate pattern section upon which the mold section for the head side of the rails is formed, the similar parts being indicated by primed numerals 1' to 5', inclusive. Preferably, means are provided for locking the headboard to the backboard, under certain conditions of use, the particular means exemplified in the drawings consisting of ordinary hooks and eyes 6 and 6'. It will be noted that the backboards 1 and 1' are substantially coextensive with the inner faces of the corresponding mold sections and define the inner faces of said mold sections which abut each other when the mold is assembled about the ends of the rails.

Formed on the front face of the backboard 1 is a pattern section 10, which, for its larger part, conforms strictly to one-half section of the rail to be welded, the intermediate portion of the pattern element being provided with a rib or extension 11, which defines the reinforcing collar to be formed in the welded joint.

Secured to the under face of the headboard 5 is a pattern section 12, which defines substantially one-half of the slag basin or reaction chamber as usually provided in the upper or cope section of the mold, this pattern section having extending therefrom the pattern section 13, which constitutes the pattern for the pouring gate, which is usually located in the completed mold immediately above the gap separating the rail ends on the lip side.

Similarly secured to the front face of the backboard 1' is a pattern section 10' fashioned to conform to the contour of the half rails on the head sides of the latter and provided with the median rib 11', which defines the reinforcing collar on that side of the weld.

Formed on or secured to the under face of the headboard 5' is a pattern section 12', which defines the other half or section of the slag basin or reaction chamber in the top of the finished mold, which pattern section includes a projection 13', which defines the vent or riser opening in the finished mold and which connects the mold cavity with the bottom of the slag basin.

As thus constituted, each half pattern, or the pattern for each half mold section, comprises a pattern section on the backboard, which defines one-half of the mold cavity proper, and another pattern section on the headboard, which defines one-half of the cavity in the upper portion of the mold and the connection between said cavity and the mold cavity proper, that is to say, either the pouring gate, or the vent or riser.

When the two pattern sections are locked together by the latches 6 and 6', the pattern, as a whole, is substantially like the standard pattern for forming one-half of a two-part mold and may be employed in the usual manner for forming such mold half. Under these conditions, the patterns for the respective mold halves are practically identical with the standard patterns used in the same relation. The two parts of each mold box half section are locked together and placed in proper position on the respective backboards and the refractory material is rammed into the mold box sections in the customary manner, completely filling the space in said box sections about the patterns. When the ramming operation is complete, the headboards 5 and 5' are unhooked from the corresponding backboards and moved relatively to the latter to the positions indicated in dotted lines in Fig. 1, thereby completely withdrawing the pattern elements carried by the headboards from the mold and permitting the half mold sections to be withdrawn from the pattern elements carried by the backboards. It will be understood, of course, that, in this particular operation, the groove in the pattern, corresponding to the grooves in the rail ends, is provided with a filler or is covered by a thin strip of metal, as is usual in the formation of a standard two part mold, after which the supplemental part of the mold to fill the grooves is formed separately in the grooves of the adjacent rail sections before the two part mold is applied.

When the pattern sets are to be employed in forming a four part mold for use without interrupting traffic, the two sections of each mold box half are separated by thin shims or parting plates 15, 15' and then applied to the backboards as before, so that, when the refractory material has been rammed into the mold box sections and the headboards withdrawn, the upper section of the mold box half on the groove side may be withdrawn by first moving the same along the backboard to free the refractory portion of the mold occupying the grooves and then lifting the mold section off the backboard. As there are no reentrant angular sections on the pattern on the head side, the two sections of the half mold on the backboard 1' may be lifted off directly, after which the two sections of each half mold box may be locked together and are ready for application to the rail ends to effect the formation of the joint thereat, the four sections of the completed mold as applied to girder or trilby rails occupying the relation indicated in Fig. 4.

Figure 5:
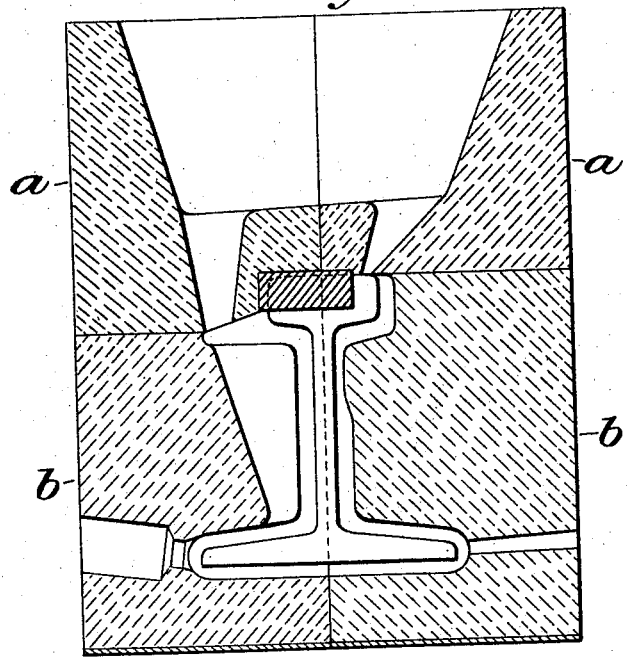

In applying the invention to molds for forming the four sections necessary to enclose the ends of ordinary T-rails, the only changes involved will be in the particular shapes of the patterns applied to the baseboards and the headboards, respectively, the patterns taking the shapes of the spaces indicated in Fig. 5, that is to say, the spaces defining the mold cavity proper, the slag basin, the pouring gate and the vent or riser.

Figure 4:
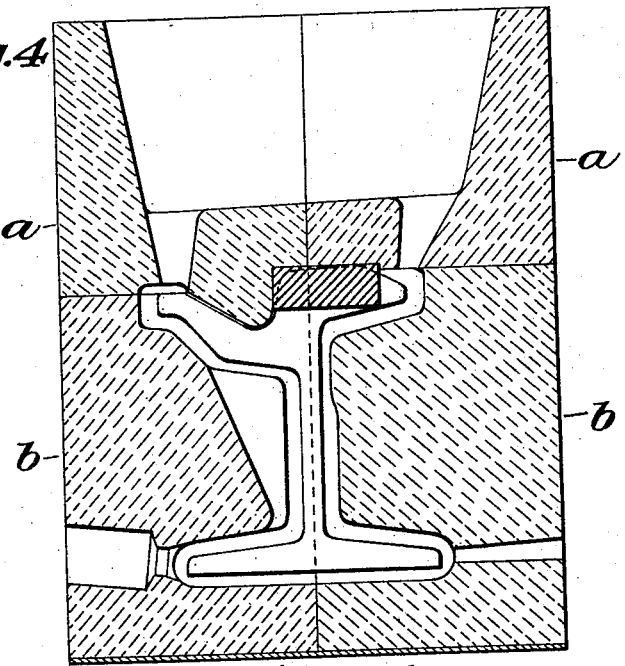
Figs. 4 and 5 are sectional elevations of four part molds for girder and T-rails, respectively.

It will be understood that in the construction of the four part mold to be applied to either type of rails, the two upper portions of each half mold section, as indicated at $a, a$, in Figs. 4 and 5, are clamped together and, when so united, constitute a separable cope, which may be removed and replaced at will on the lower mold sections $b, b$, to accommodate traffic without interrupting the operations incidental to the formation of the weld.

What I claim is:

1. Pattern sets for rail welding molds, comprising backboards having pattern sections defining the mold cavity proper thereon, headboards normal to the planes of the respective backboards and having pattern sections thereon defining the cavities in the cope, and means for connecting the corresponding backboards and headboards to permit movement of each headboard in a direction parallel to the plane of the corresponding backboard and normal to its own plane.

2. Pattern sets for rail welding molds, comprising backboards having pattern sections defining the mold cavity proper thereon, headboards normal to the planes of the respective backboards and having pattern sections thereon defining the cavities in the cope and sliding connections between the corresponding backboards and headboards to permit movement of each headboard in a direction parallel to the plane of the corresponding backboard and normal to its own plane.

3. Mating pattern sets for rail welding molds, each comprising a backboard having a pattern section thereon defining one-half of the mold cavity, and a headboard slidably connected to the backboard for movement in a direction longitudinally of and parallel to the face of said backboard and having a pattern section on its inner face defining a portion of the cope section cavity.

4. Mating pattern sets for rail welding molds, comprising backboards and headboards having pattern sections thereon adapted to define portions of the mold cavity and a cope cavity respectively, and means for adjustably connecting the headboards and the respective backboards; whereby each backboard pattern section may be stripped from the mold after movement of the headboard relatively to the backboard to strip the headboard pattern section.

5. Mating pattern sets for rail welding molds, comprising backboards and headboards having pattern sections thereon adapted to define portions of the mold cavity and a cope cavity respectively, and means for slidably connecting the headboards and the respective backboards; whereby each backboard pattern section may be stripped from the mold after movement of the headboard parallel to the face of the backboard to strip the headboard section.

6. A pattern set for one-half of a rail welding mold, comprising a backboard having a pattern section thereon defining a part of the body cavity of the mold, longitudinal guides on the rear of the backboard, a headboard substantially normal to the face of the backboard, a slide secured to the headboard and engaging said guides for movement along said backboard, and a pattern section on the inner face of said headboard defining a part of the cope cavity.

In testimony whereof I affix my signature.

BELA RONAY.